Oct. 18, 1966 R. M. WORREL 3,279,160
FORAGE HARVESTERS
Filed July 8, 1963 5 Sheets-Sheet 1
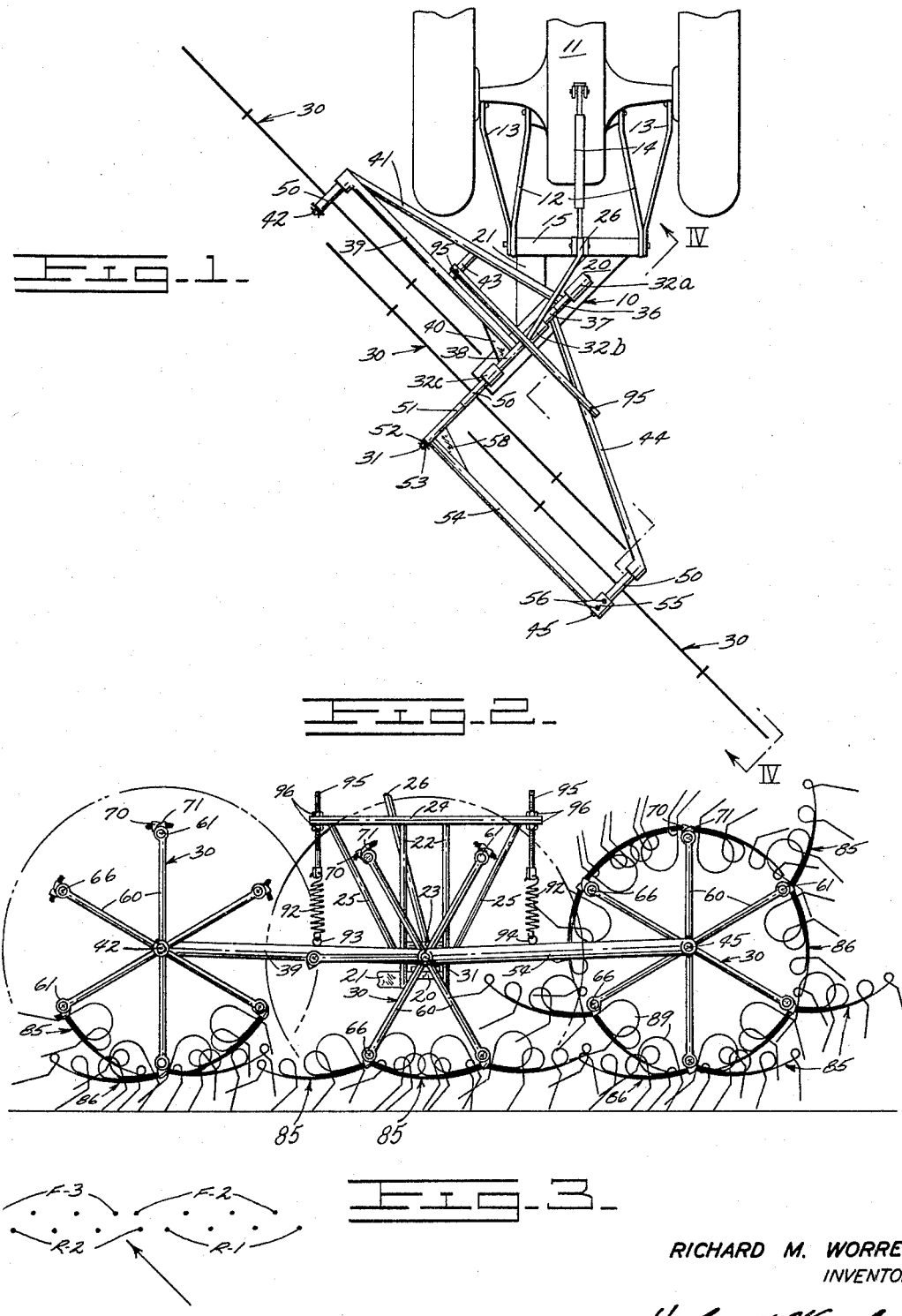
RICHARD M. WORREL
INVENTOR
Huebner & Worrel
ATTORNEYS

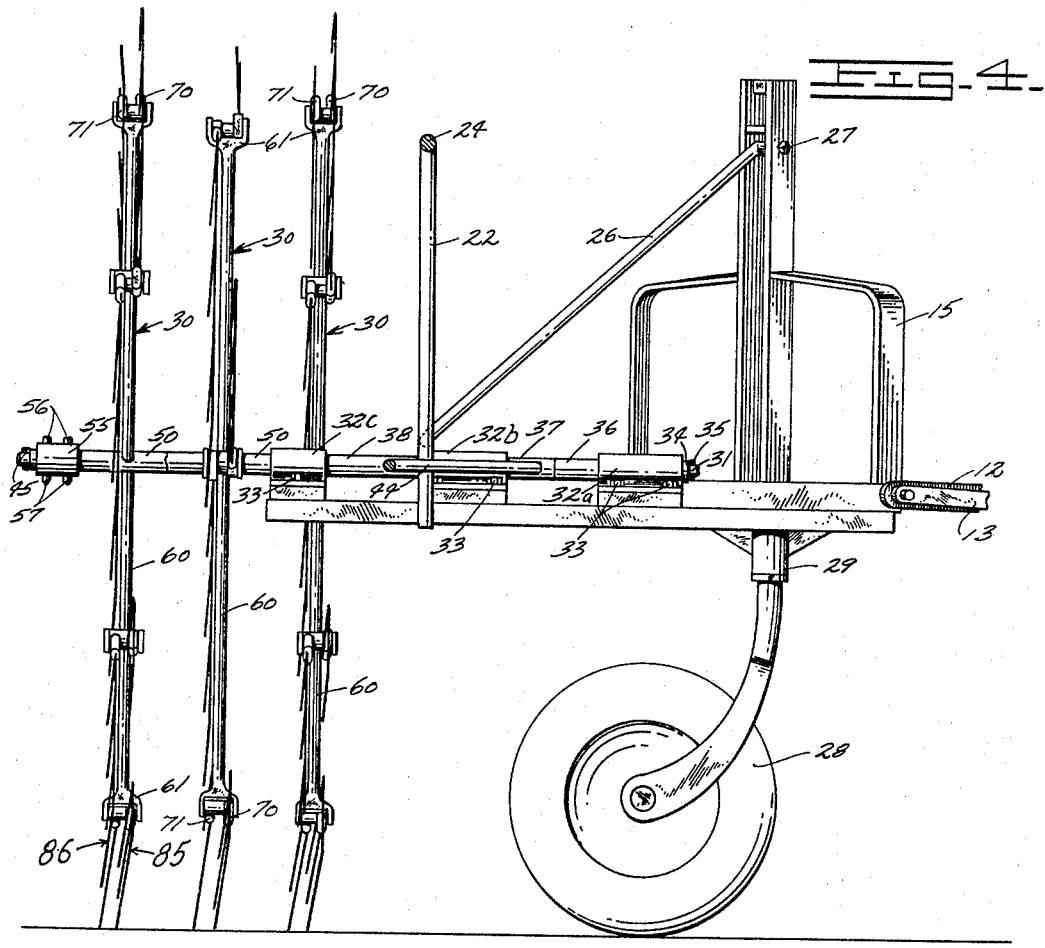
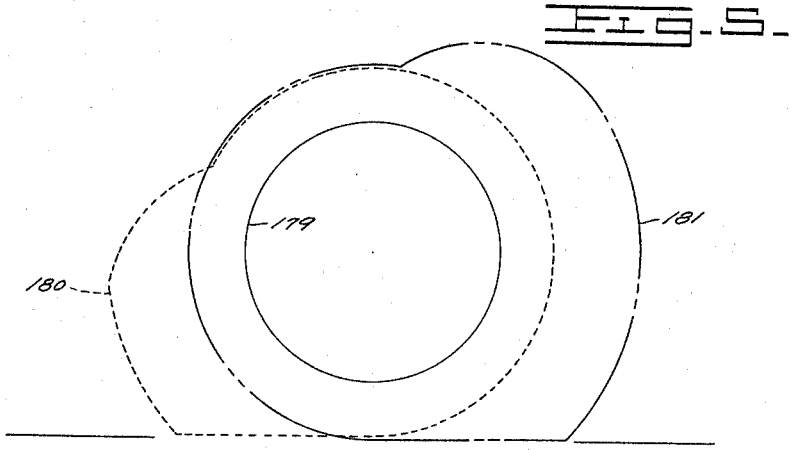

Oct. 18, 1966 — R. M. WORREL — 3,279,160
FORAGE HARVESTERS
Filed July 8, 1963 — 5 Sheets-Sheet 3
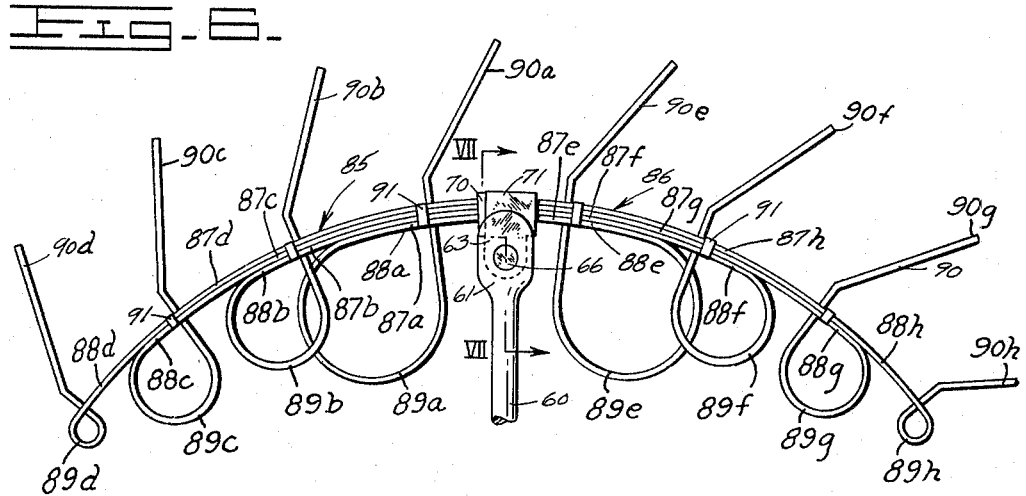
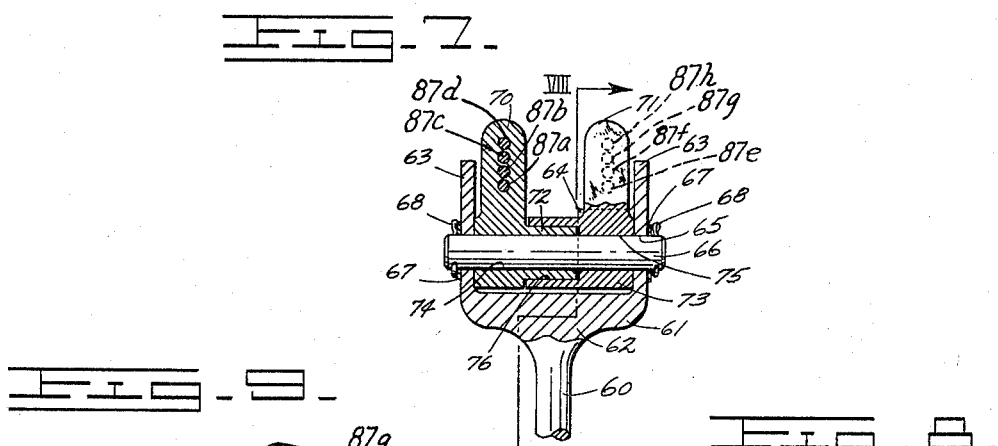
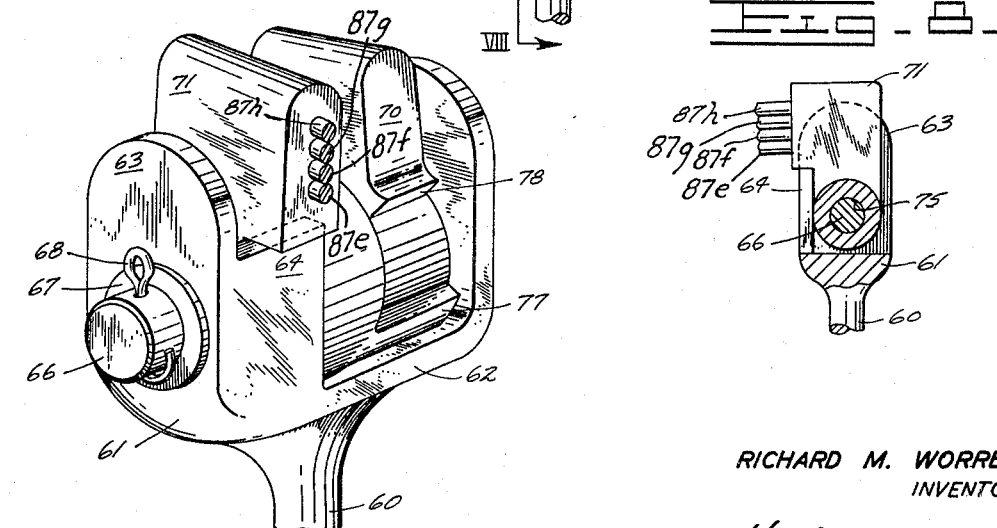
RICHARD M. WORREL
INVENTOR
Huebner & Worrel
ATTORNEYS

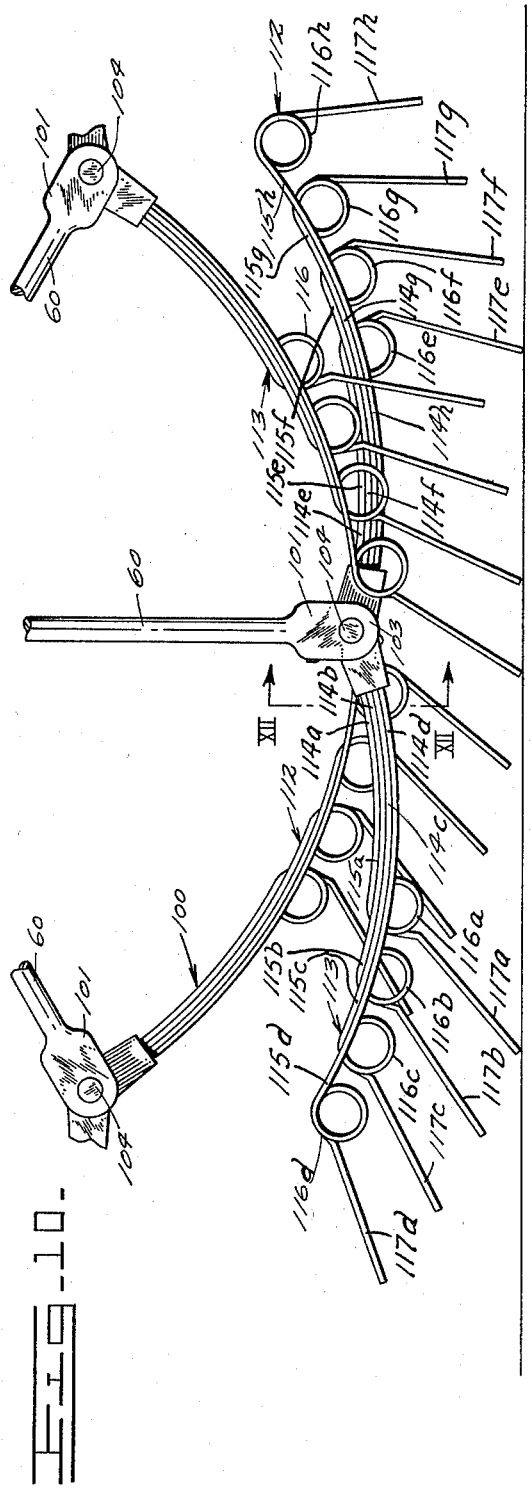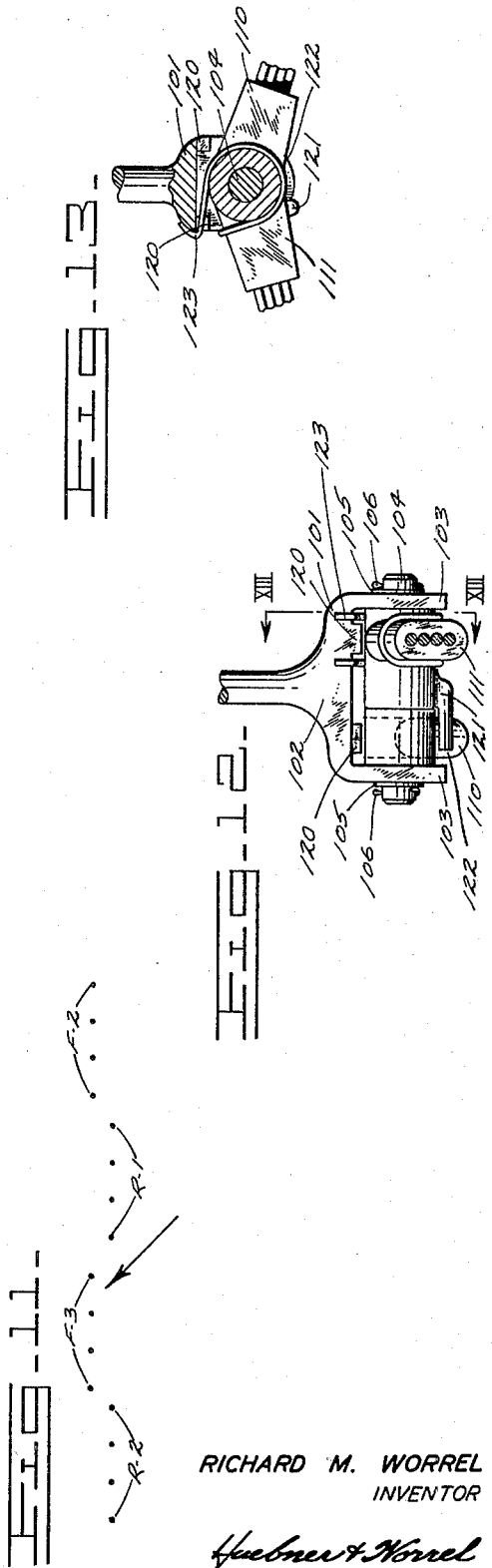

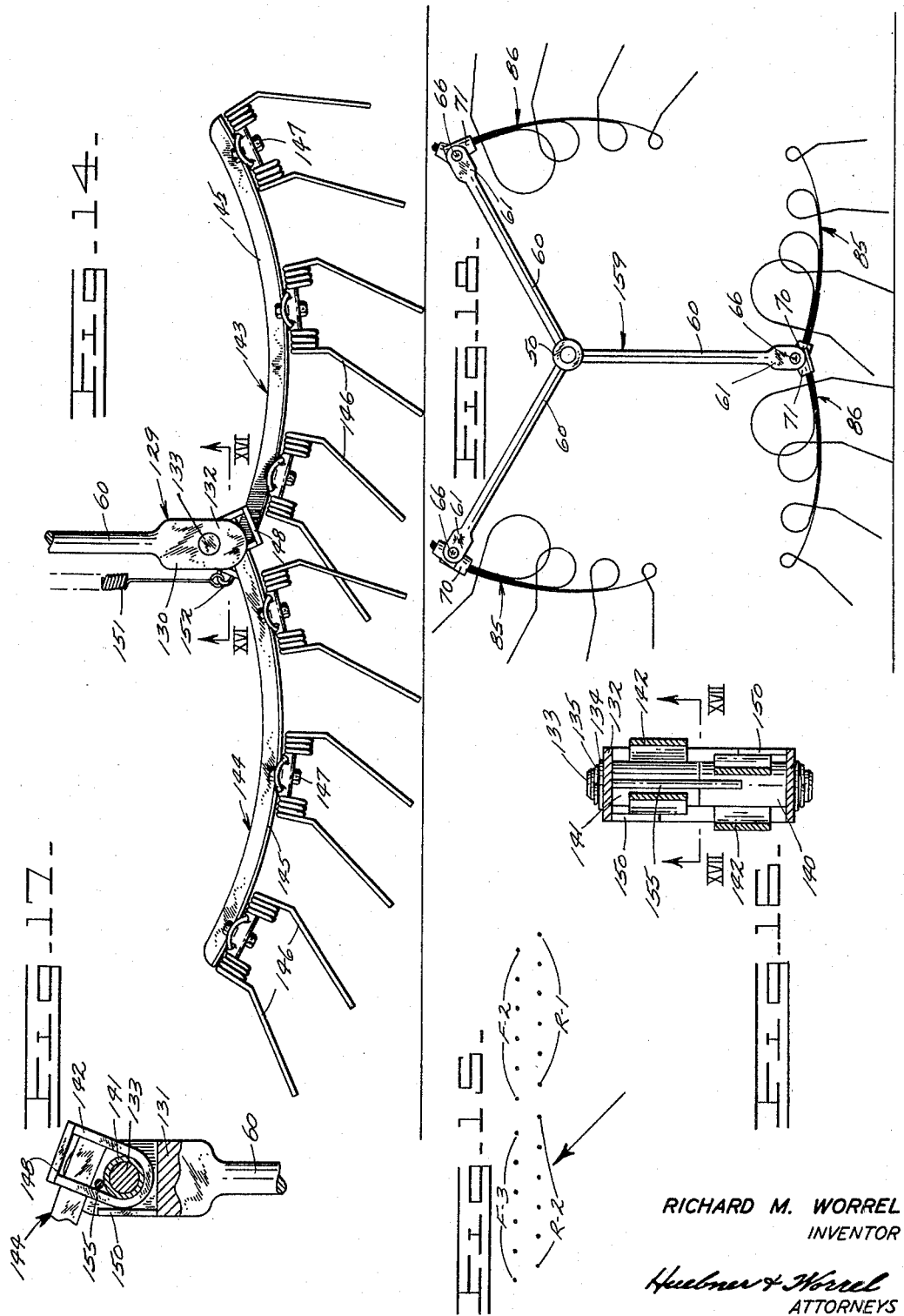

United States Patent Office 3,279,160
Patented Oct. 18, 1966

3,279,160
FORAGE HARVESTERS
Richard M. Worrel, Fresno, Calif., assignor of one-half to Herbert A. Huebner, Los Angeles, Calif.
Filed July 8, 1963, Ser. No. 293,489
18 Claims. (Cl. 56—377)

The present invention relates to rotary side delivery forage harvesters of the wheel type and more particularly to such a harvester having wheels providing relatively movable peripheral segments for improved conformance to terrain traversed, increased efficiency and augmented capacity.

Rotary side delivery forage harvesters of the wheel type are characterized by the implements shown in U.S. Patent No. 2,447,354 to Morrill and No. 2,977,743 to Giles. Such implements have proved to be innovations of major significance and have been subject to many refinements and variations of wide scale use throughout the world. However, it has long been recognized that increased wheel capacity should lead to improved efficiency, that greater wheel flexibility should lead to better conformance to the ground surface and that the attainment of both increased efficiency and improved conformance should result in significant enhancement of the operational characteristics and utility of such implements. Extensive efforts have been directed to these ends for many years with mixed or partial success. Improved flexibility has in some instances been achieved but with the sacrifice of other desired characteristics. Virtually no increase in wheel capacity heretofore has been attained other than by simply increasing wheel diameters, an expedient of quite limited acceptability in commercial units.

As will hereinafter become more fully apparent, the broad essence of the instant invention resides in the provision of a forage harvester having a plurality of raking wheels having peripheral segments pivotally mounted in their respective wheels for movement between positions substantially concentric to their wheels and positions pivoted outwardly thereof for increased linear dimension of engagement with forage disposed on the ground. The invention also encompasses the provision of pivot regulating means in such a wheel to cause the segments successively to assume their concentric positions for rolling movement of their wheel thereover while successively adjacent segments pivot to positions substantially tangential to the ground. Ancillary to the invention is the provision in such a wheel of pairs of such segments, each including a leading segment and a trailing segment, and means coacting between the segments translating gravitational positioning of one segment into position regulation of its companion segment. Further, the invention includes the provision of an improved raking element of tortionally resilient material adapted for use in the described forage harvester, or in other operational environments, having a forage engaging finger adapted to move over the ground in a raking action and an arm integral with the finger and laterally extended from the finger transversely of the direction of said movement for mounting remote from the finger whereby the finger can flex longitudinally of said direction of movement incident to tortional resilience of the arm.

An object of the present invention is, therefore, to provide a rotary side delivery forage harvester of the wheel type having significantly increased capacity per wheel employed.

Another object is to provide such a harvester having improved conformance to ground surface traversed.

Another object is to provide such a harvester having substantially fewer raking wheels to achieve a given swath of operation than known devices for the purpose.

Another object is to provide raking wheels for such harvesters having relatively movable peripheral segments which during operation are successively rested on the ground.

Another object is to provide positional control means operably associated with the segments of such wheels to insure their progressive positioning for effective operation.

Another object is to provide a simple mounting for such segments in their respective raking wheels which is operable quickly and easily to mount and to release such segments for adjustment, repair or replacement.

Another object is to provide such a harvester having increased flexibility in the planes of the raking wheels without excessive or objectionable flexibility from such planes.

Other objects are to provide such a harvester which is substantially lighter, easier to employ, and more economical to produce and maintain than known harvesters of the wheel type and of comparable capacity.

Another object is to provide such a harvester which minimizes the requirements for wheel mounting and associated structure.

Another object is to provide such a harvester which makes possible greater design variations to meet specialized requirements.

Another object is to permit easier, speedier and more economical repair of such harvesters.

Another object is to minimize forage shattering in the use of such harvesters by reducing the frequency of forage transfer from raking wheel to raking wheel.

A further object is to provide raking fingers in such harvesters which utilize tortional resilience to resist rearward drag.

Still further objects and advantages of the present invention will subsequently become more clearly apparent in the description of the structure and operation of the illustrative embodiments thereof.

Referring to the drawings:

FIG. 1 is a top plan view of the forage harvester of the present invention shown coupled to a draft appliance which is fragmentarily represented.

FIG. 2 is a rear elevation of the forage harvester of FIG. 1 viewed axially of the raking wheels thereof.

FIG. 3 is a schematic representation of typical points of ground engagement by raking fingers employed in the harvester of FIGS. 1 and 2.

FIG. 4 is a side elevation of the harvester, as viewed from line IV—IV of FIG. 1.

FIG. 5 is a diagrammatic representation of the orbits of travel of the raking fingers during operation of the harvester.

FIG. 6 is a somewhat enlarged fragmentary axial view of one of the raking wheels showing a mounting spoke and a pair of raking element assemblies utilized therein.

FIG. 7 is a section taken on line VII—VII of FIG. 6.

FIG. 8 is a section taken on line VIII—VIII of FIG. 7.

FIG. 9 is a somewhat enlarged fragmentary perspective of the mounting and position control structure shown in FIGS. 6 through 8.

FIG. 10 is a fragmentary rear elevation of a second form of raking wheel of the present invention.

FIG. 11 is a schematic representation of typical points of ground engagement by raking fingers of the raking wheel of FIG. 10.

FIG. 12 is a somewhat enlarged fragmentary section taken on line XII—XII of FIG. 10.

FIG. 13 is a somewhat enlarged section taken on line XIII—XIII of FIG. 12.

FIG. 14 is a fragmentary rear elevation of a third form of raking wheel of the present invention.

FIG. 15 is a schematic representation of typical points of ground engagement of raking fingers utilized in the rake wheel of FIG. 14.

FIG. 16 is a somewhat enlarged fragmentary section taken on line XVI—XVI of FIG. 14.

FIG. 17 is a section taken on line XVII—XVII of FIG. 16.

FIG. 18 is a fragmentary rear elevation of a fourth form of raking wheel of the present invention.

Referring in greater detail to the drawings:

Although the forage harvester of the present invention may utilize any suitable frame structure and be pushed or pulled by any desired prime mover, it is illustrated as utilizing a simplified frame structure 10 borne for earth traversing movement by a tractor, fragmentarily illustrated at 11. The tractor provides a pair of rearwardly extended, power-actuated lift arms 12, drift arms 13, of the well-known form adapted to resist side sway of the lift arms, and a draft control link 14. An A-frame 15 is mounted on the rearwardly extended ends of the lift arms 12 and the draft control link 14. As is well known in tractors of the type illustrated, hydraulic systems having operator controls, not shown, are provided whereby the lift arms 12 can be manipulated to raise and lower the A-frame 15, as desired. In other adjustment, the system is conditioned so that the A-frame floats on the tractor at such elevations as any implement connected thereto may cause, and in further adjustment the system operates automatically to raise and lower the A-frame in response to variations in resistance to forward movement imposed thereon and causing a forward thrust on the link 14.

The frame includes a beam 20 welded to the right side of the A-frame 15 and rearwardly substantially horizontally extended therefrom obliquely toward the left side of the tractor. The beam is disposed at approximately 45° angular relation to the direction of travel of the tractor 11, or the longitudinal axis thereof, as a convenient reference. A brace 21 is welded to the opposite side of the A-frame and rearwardly extended for intersection with the beam 20 to which it is welded in triangular assembly with the A-frame.

A spring supporting superstructure is optionally employed including a pair of upright standards 22 welded to opposite sides of the beam 20 adjacent to its intersection with the brace 21. The standards are interconnected in parallel relation by a lower spacer 23 adjacent to the beam 20 and a supporting arm 24 interconnecting the upper ends of the standards and oppositely extended to each side of the beam 20 in substantially 90° angular relation thereto. Struts 25 are preferably welded to the beam 20 and upwardly divergently extended and connected to the outer ends of the supporting arm 24. A tension rod 26 rigidly interconnects the spacer 23 and the upper end of the A-frame 15, at 27. A suitable swivel gauge wheel 28 is preferably mounted beneath the frame 10 in a vertical mounting 29 and serves to limit the extent to which the frame can be lowered with respect to the ground so as to protect the raking wheels to which reference is now made.

The frame 10 mounts three raking wheels 30 for independent free rotation in substantially erect parallel planes obliquely related to the direction of travel of the tractor 11. For purposes of simplicity and economy, the wheels are mounted on a single shaft 31 of high stress steel or the like mounted in a plurality of pillow blocks 32a, 32b and 32c rigidly secured in longitudinal alignment on the beam 20, as by bolts 33. To resist rearward shifting of the shaft 31, it is provided with a thrust collar 34 in circumscribing relation thereto adjacent to the forward end of the forwardmost pillow block 32a and a pin 35 is extended through the shaft in abutment with the collar. A forward bearing 36 and a rearwardly adjacent bearing 37 are mounted on the shaft between the forward and middle pillow blocks 32a, 32b. A further bearing 38 is mounted on the shaft between the middle and rearward pillow blocks 32b, 32c. A compression arm 39 is rigidly connected to the bearing 38, as by welding, and is right angularly extended therefrom obliquely forwardly of the shaft 31. A gusset plate 40 is preferably utilized to brace the rigid interconnection of the arm and its bearing. A tension arm 41 is similarly rigidly secured to the forward bearing 36 and is radially extended forwardly from the shaft and converges with the outer end of the arm 39. The arms 39 and 41 are weldably interconnected at their outer ends. An axle 42 is rigidly mounted on the outer ends of the arms 39 and 41 and is rearwardly extended therefrom in parallel relation to the shaft 31. For purposes of greater rigidity, a brace 43 interconnects the arms 39 and 41 intermediate their inner and outer ends.

A tension arm 44 is rigidly connected to the bearing 37 and rearwardly extended therefrom. An axle 45 is mounted on the rearward end of the arm 44 and rearwardly extended in parallel relation to the shaft 31 and axle 42.

As will hereinafter become more clearly evident in the structural description of the wheels 30, each thereof provides a hub 50. The hub of a forward wheel is rotatably mounted on the axle 42. The hub of a middle wheel is rotatably mounted on the shaft 31 rearwardly adjacent to the rear pillow block 32c and a rearward wheel is rotatably mounted on the axle 45. For raking purposes, the wheels each forwardly overlap the wheel rearwardly adjacent thereto, when viewed axially, for cooperative windrow formation. However, it is to be understood that the wheels may be mounted in any desired structure or pattern to perform tedding, windrow turning, raking and like functions, as desired, without departing from the spirit or purposes of the present invention.

A spacer bearing 51 is slidably received on the shaft 31 rearwardly against the hub 50 of the middle raking wheel and held in position by a collar 52 mounted on the shaft and a pin 53 extended through the shaft in collar engagement. A compression arm 54 is rigidly connected to the spacer bearing 51 and rearwardly extended therefrom in substantially right angular relation to the shaft 31. The rearward end of the compression arm 54 mounts a sleeve 55 which is slidably fitted to the axle 45 and secured thereon by a pair of bolts 56 extended through the sleeve and axle and secured in position by nuts 57 screw-threaded onto the bolts. At this point is will be evident that the harvester is assembled on the shaft 31 and can be quickly disassembled by removing the pin 35 and collar 34 and sliding the shaft rearwardly from the pillow blocks 32 and the several bearings or by removing the pin 53 and the collar 52 and sliding the shaft forwardly through the pillow blocks and the several bearings. Like the arms 39 and 41, the arms 44 and 54 with their axle 45 and bearings 37 and 51 constitute a rigid unit. For increased rigidity, a gusset plate 58 is preferably provided at the juncture of the compression arm 54 and the spacer bearing 51.

*First form of raking wheel*

The first form of raking wheel 30 is illustrated in FIGS. 1 through 9. Six spokes 60 of equal length are rigidly mounted on each of the hubs 50 and radially extended from their hub in equal angular relation. Integral with the outer end of each spoke is a mounting yoke 61. Each yoke has a base 62 substantially parallel to the axis of the hub and substantially parallel ears 63 extended therefrom outwardly of the wheel. Integral with the base and each ear are stop plates 64. The ears of each yoke are substantially aligned in a plane longitudinal of their respective hub, although disposed in individual planes normal to the hub, and thus there is a relatively rearward ear and a relatively forward ear.

As the wheels 30 roll over the ground, they turn in a counterclockwise direction, as viewed in FIGS. 2 and 6. Thus, each of the ears has relatively forward and rearward edges with respect to the direction of wheel rotation. As best shown in FIGS. 7, 8, and 9, the stop plate for the rearward ear of each yoke is extended from the rearward edge of its respective ear forwardly in a plane substantially common to its hub and is interrupted intermediate the ears. Conversely, the stop plate of the forward ear of each pair is integral with the forward edge thereof and is rearwardly extended in a plane substantially common to its hub to a position intermediate the ears.

The yokes 61 are conveniently cast or fabricated so that their bases 62, ears 63 and stop plates 64 are integral. Bores 65 are provided in alignment through the ears 63 and pivot pins 66 are extended therethrough in substantially parallel relation to their respective hubs 50. Washers 67 are provided on the pins 66 outwardly against the ears 63 and the pins are secured in position by cotter keys 68 extended through opposite ends thereof in outward engagement with the washers.

A forward mounting block 70 and a rearward mounting block 71 having forward and rearward bearings 72 and 73, respectively, are journaled on each of the pins 66 between their respective ears 63. In order to distribute the bearing forces, the forward bearing 72 is extended along the pin 66 a considerable distance in excess of half the distance between the ears and provides a bore 74 fitted to the pin. The rearward bearing 73 also is extended along the pin more than half the distance between the ears 63 but is of somewhat different configuration. It provides a portion having a bore 75 fitted to the pin and extended from the rearward ear to the adjacent end of the bearing 72 and has an extended portion providing a counterbore 76 which rotatably receives the rearwardly extended portion of the bearing 72.

As best shown in FIGS. 6 through 9, the rearward mounting block 71 is fitted to its stop plate 64 and the forward mounting block 70 is similarly fitted to its stop plate 64. So mounted, the rearward mounting block 71 is free to rotate through a substantial arc in the same direction as the rotation of its respective wheel in rolling over the ground but is limited in its opposite direction of rotation by engagement with its stop plate 64. The forward mounting block 70 is free to rotate through a substantial arc in the direction opposite to the direction of rotation of its raking wheel but is limited in its rotation in the same direction as the raking wheel by engagement with its stop plate 64. For purposes soon to become apparent, the rearward bearing 73 is provided with a tucking finger 77 extended longitudinally along the forward bearing 72. The forward bearing is provided with a tucking shoulder 78 disposed for engagement by the finger 77 when the rearward mounting block rotates in the direction of wheel rotation and/or the forward mounting block rotates in the direction opposite thereto. As will be appreciated, the maximum angular spacing of the tucking finger and tucking shoulder determine the extent to which the finger's respective rearward segment can pivot outwardly when its companion forward segment is in concentric position against its stop and conversely determines the extent to which said forward segment can pivot outwardly when its companion rearward segment is in concentric position. The angular spacing is not critical but a generally preferable relationship exists. When the rearward segment reaches the forage or ground and when the forward segment departs from the forage or ground their outer ends are preferably approximately tangential thereto. Depth of forage and the angular peripheral length of the segments effect the optimum maximum angular spacing of the tucking finger from the tucking shoulder but for segments of the type shown, each of which is approximately ⅙ of the circumference of its raking wheel, the finger and shoulder preferably have a maximum spacing of from approximately 65° to 75°.

The mounting blocks 70 and 71 are mounting and position control expedients for raking element assemblies or wheel peripheral segments 85 and 86, respectively. The mounting block 70 mounts a plurality of raking elements 87a through 87d and the mounting block 71 mounts a plurality of raking elements 87e through 87f. Four such elements are illustrated in FIG. 6 as utilized for each block and provide a practical number for successful forage harvesting purposes. Each of the raking elements provides an arcuate arm portion, designated at 88a through 88h for the several elements, substantially concentric to its respective wheel, an inwardly disposed loop, designated at 89a through 89h, continuous with its arm, and an outwardly extended finger, shown at 90a through 90h, continuous with its loop. The four arms 88a through 88d or 88e through 88h of each segment are preferably nested in concavo-convex relation and the arms are of graduated length, the outer arms 88d and 88h being the longest and the successively inner arms being progressively shorter in substantially equal increments. To achieve substantially equal resilient flexibility, each raking element is made from the same length of spring rod material with the relatively shorter arms having correspondingly larger loops 89a through 89h so as to utilize the additional length of material and so that the fingers 90a through 90h extend outwardly substantially the same distance from the outermost ends of the arms. The arms and their respective loops and fingers are referred to as being disposed in substantially the same plane although each finger crosses its respective arm and all arms shorter than its respective arm in engagement with the forward side thereof with respect to the direction of earth traversing movement of the harvester. Thus, the arms serve as braces against rearward drift of the fingers in forage engagement. The fingers have inner portions which extend across the arms substantially radially of their respective wheels when their segments are in concentric positions and then provide angularly rearwardly directed portions with respect to the direction of wheel rotation. Such angling of the fingers facilitates forage engagement and accumulation into a windrow and release of the forage with a minimum of entanglement. The fingers may also be angularly directed or curved rearwardly of the direction of movement of the harvester, if desired, but whether or not so angled or curved, nevertheless drag rearwardly during operation incident to their inherent resilience. Further, the overlaying arms 88a through 88h at each position where traversed by a finger 90a through 90h are preferably circumscribed by a band 91 constricted thereabout to assist the arms of each assembly in acting as a coordinate unit.

Although many methods of forming the segments 85 and 86 will occur to those skilled in the art, it has been found expedient first to form the raking elements 87a through 87h out of spring steel rod and then to cast the mounting blocks 70 and 71 about their respective raking elements. It is worthy of note in this form of the raking wheels that the arms 88a through 88h are spaced radially of their wheel outwardly from the centers of the pins 66 about which they pivot. As a result, their centers of gravity are radially outwardly of a circle concentric to their respective wheels passed through the pins 66.

During operation of the wheels 30, each forward segment 85 forwardly overlaps, with respect to the direction of movement of the harvester, the rearward segment 86, of the spoke forwardly thereof in the direction of wheel rotation. This is best observed in FIG. 3. The fingers 90a through 90h in each segment are spaced circumferentially of the wheel approximately twice the optimum distance required by a single row of fingers to achieve desired raking efficiency, however, the segments are so related that when they overlap in earth engagement the fingers of the rearward segments 86 are substantially midway between the fingers of the forward segments 85 when viewed axially of the wheels.

In order to lighten the engagement of the raking wheels 30 with the ground, tension springs 92 are individually connected to the compression arm 39 and the tension arm 44 at 93 and 94 respectively. Adjustment bolts 95 are connected to upper ends of the springs and are upwardly extended through opposite ends of the supporting arm 24. Nuts 96 are screw-threaded on the bolts above and below the arm and by proper adjustment serve to regulate the supporting influence exerted by the springs on their respective arms.

Second form of raking wheel

The second form of raking wheel 100, shown in FIGS. 10 through 13, employs the same hub 50 and spokes 60 and these elements are not further described. Concentrically of the hub, the spokes 60 bear mounting yokes 101 which are similar to the yokes 61 in their provision of bases 102 and ears 103 but which do not provide stop plates like those shown at 64. Mounting pins 104 are extended through the ears 103 in substantially parallel relation to the hub and the pins are secured in position by washers 105 and cotter keys 106 in the manner described for the washers 67 and cotter keys 68.

A forward mounting block 110 and a rearward mounting block 111 are journaled on each of the pins 104. Each pair of mounting blocks 110 and 111 preferably provide overlapping bearings of the type designated at 72 and 73 in FIG. 7. The forward mounting blocks 110 are portions of forward peripheral segments 112 that are extended from each of the pins 104 in the direction of wheel rotation on the forward side of the wheel. The rearward mounting blocks 111 are parts of rearward peripheral segments 113 that are provided on each of the pins 104 and extended therefrom in the direction opposite to the direction of wheel rotation and on the rearward side of the wheel. Each of the peripheral segments includes a plurality of raking elements 114a through h mounted in their respective mounting blocks. Each element consists of an arm 115a through h having an inner end cast or otherwise secured in its mounting block, a loop 116a through h continuous with the arm, and a raking finger 117a through h continuous with the loop. As before, the raking elements are preferably formed from spring steel rod or the like. The arms of each segment are concavo-convex and are in nested engagement in a common plane. The segments 112 and 113 differ from the segments 85 and 86 in several respects. The raking elements 114a through h are substantially radially extended from their respective pins 104, rather than being eccentrically disposed, as the elements 87a through h. Instead of the fingers 117a through h being spaced substantially twice that desired for raking efficiency, as for fingers 90a through h, they are spaced the desired distance but are clustered in adjacent alignment at the outer ends of their respective segments in such spaced relation. The loops 89a through h, previously described in connection with FIG. 6, looped inwardly of their respective wheels. To keep the endmost loops 116d and h from hitting their adjacent yokes 101 and to keep the loops from interfering with each other, they are looped outwardly of their respective wheels. Although the arms, loops, and fingers of the raking elements 114a through h are referred to as being substantially in a common plane for descriptive convenience, they are not precisely in a common plane and it will be observed that the loops are against the forwardly disposed sides of the arms and that the fingers extend outwardly of the wheel at the forward sides of the arms.

By reference to FIG. 10 it will be evident that the sets of fingers of the segments of each spoke in the second form of raking wheel 100 are spaced a distance such that two corresponding sets of such fingers can fit therebetween in ground engagement. To achieve this, the forward peripheral segment 112 of one spoke is rearwardly overlapped by the rearward peripheral segment 113 of the spoke in leading relation thereto. Thus the fingers 117 of the forward segment 112 of the relatively rearward spoke lead the fingers of the rearward segment 113 of the relatively leading spoke both in direction of wheel rotation and axially of the raking wheel. Conversely, the rearward segment 113 of each spoke is forwardly overlapped by the forward segment 112 of the respective spoke rearwardly adjacent thereto in the direction of wheel rotation. Preferably the yokes 101 are slightly rotated about their spokes 60 from positions with their pins 104 precisely conforming to planes longitudinally of the hubs and radially extended therefrom so as to move the forward segments 112 slightly rearwardly in reference to the plane of the wheel and correspondingly to move the rearward segments somewhat forwardly with respect to the plane of the wheel.

The base portions 102 provide stops 120 adjacent to the mounting blocks 110 and 111 so as to limit inward pivotal movement of the peripheral segments 112 and 113 to positions with the arms 115a through h disposed substantially concentrically of their respective wheel. As described for the first form of raking wheel, each of the rearward mounting blocks 111 provides a tucking finger 121 extending axially of its companion forward mounting block 110 which latter is provided with a shoulder engageable by the finger so that upon outward pivotal movement of the rearward peripheral segment relative to the wheel, the shoulder is engaged by the finger 121 and the forward peripheral segment 112 moved inwardly against the stops 120. Since the arms 115a through h are substantially radially extended from the pins 104, the centers of gravity of the peripheral segments 112 and 113 are somewhat inwardly of the centers of balance of the peripheral segments 85 and 86. It is therefore desirable to facilitate the gravitational outward pivotal movement of the rearward peripheral segments 113 incident to wheel rotation so that such outward pivotal movement occurs early enough to tuck its companion forward peripheral segment 112 inwardly against the wheel so that the wheel may conveniently roll thereover. For this purpose, a spring 123 is extended about the rearward mounting block 111, coiled about the bearing thereof, and hooked over the base 102 under such stress as lightly to urge its respective segment outwardly. It is not necessary that the spring be so strong as to overcome the weight of the segment when rested thereagainst but merely adequate to cause outward pivotal movement of its segment somewhat earlier than would otherwise occur.

Third form of raking wheel

The third form of raking wheel 129 is illustrated in FIGS. 14 through 17 and utilizes the same hub 50 and spokes 60, which are not again described. The spokes 60 terminate at their outer ends in mounting yokes 130 similar to the yokes 61 and 101 and which similarly provide bases 131 and opposite ears 132. Pins 133 are extended through the ears in substantially parallel relation to the hubs 50, also as previously described. The pins are secured in position by washers 134 positioned outwardly against the ears and cotter keys 135 extended through the pins outwardly against the washers. A forward bearing 140 and a rearward bearing 141 are rotatably mounted on each of the pins 133. Rigid U-shaped strap members 142 are individually fitted about the bearings 140 and 141 and provide legs outwardly extended from the yokes 130. The strap members are welded or otherwise rigidly secured to their respective bearings. The strap members and bearings constitute portions of forward peripheral segments 143 and rearward peripheral segments 144 oppositely circumferentially extended with respect to the wheel from each of the pins 133.

Longitudinally arcuate rigid arms 145 are mounted on the strap members 142 and extended therefrom. To provide a rigid mounting, each arm is preferably extended through one of the legs of its strap member, abutted against the opposite leg and welded to both legs. Obviously the arm mounted on the strap member of the forward bearing is forwardly extended with respect to the direction of rotation and the arm mounted in the strap member of the rearward bearing is rearwardly extended with respect to the direction of rotation. A plurality of pairs of spring fingers 146 are releasably mounted on each of the arms 145, as by bolts 147. To reinforce the strap members 142, the outer ends of their legs are preferably interconnected by tie plates 148 welded thereto.

Stops 150 are welded on the yokes 130 in positions to abut the strap members 142 so as to limit pivotal movement of their respective arms 145 inwardly of the wheel to positions substantially concentric thereto. It will be noted that the arms 145 are disposed eccentrically of their respective pins 133, somewhat similarly to the eccentricity of the arms 88 with respect to their pins 66. It is thus found that the arms 145 have their centers of gravity disposed for somewhat more effective outward gravitational pivotal movement during rotation and being of heavier rigid construction, are prone to pivot with too much vigor. Such vigorous pivoting action results in pounding and excessive wear. This is readily overcome by connecting a tension spring 151 to the strap member 142 of the forward peripheral segment 143 at the side thereof opposite to its respective arm 145. The connection is conveniently effected by an eyelet 152 welded to the rearward leg of said strap member. The spring 151 is tensioned inwardly and connected to the hub of the wheel by any suitable means, not shown. A tucking finger 155 is welded to the rearward bearing 141 and extended longitudinally thereof between the legs of the strap member 142 mounted on the companion forward bearing 140. The tucking finger is positioned in relation to the strap member to permit lost motion between the peripheral segments but so that when the rearward peripheral segment gravitationally pivots outwardly of the rake to the desired raking position, the finger strikes the strap member 142 and tucks the forward peripheral segment 143 inwardly against its stop for rolling movement of the wheel thereover. When the forward segment pivots outwardly during wheel rotation, such pivoting is limited by engagement of the tucking finger with said strap member as the rearward segment engages its stop.

*Fourth form of raking wheel*

A fourth form of raking wheel 159 is shown in FIGURE 18 and is virtually identical to the first form and thus similar elements are given similar identifying numerals. The primary difference between the first and fourth forms of raking wheel will be clearly evident. The fourth form utilizes only three spokes 60. As a result, it has only three sets of companion peripheral segments 85 and 86. The peripherally adjacent segments of the fourth form of raking wheel do not overlap as in the first form but the raking wheel has been found to be highly satisfactory for raking and tedding certain crops. Obviously, when desired, the fourth form of raking wheel can be provided with additional fingers to minimize the finger spacing.

In the wheel 159, the yokes 61 are preferably so rotatably positioned on their respective spokes 60 that the extended ends of adjacent segments 85 and 86 are spaced axially of the wheel a distance substantially equal to the spacing axially of the wheel of the inner ends of the companion segments.

The raking wheels 30, 100, 129, and 159 may be utilized in the frame 10 or in any other suitable transporting device for raking, tedding, windrow turning and like purposes. The wheels may be employed alone, in combination with additional wheels of the same type, in combination with additional wheels of other forms shown herein, in association with conventional rotary side delivery rake wheels, or with other associated structure as functional requirements may suggest. However, to achieve the full advantages available in increased raking swath, better ground conformance, enhanced resilience, improved raking and minimized shattering, the wheels of the present invention should be utilized in multiples where a greater swath than attainable by a single wheel is desired.

*Operation*

The operations of the several illustrative embodiments of the present invention are believed to be readily apparent and are briefly summarized at this point. The forage harvester is readily transported from place to place by raising the lift arms 12 so as to elevate the harvester and its gauge wheel 28 from the ground. When a position is reached in which it is desired to initiate a raking operation, the lift arms 12 are lowered to bring the gauge wheel 28 into ground engagement. The relative positions of the gauge wheel and the raking wheels 30 are such that the raking wheels are then brought into proper engagement with forage disposed upon the ground.

As the tractor 11 is driven forwardly, the raking wheels 30, 100, 129 or 159 are rotated in rolling engagement with the ground and/or forage traversed. If uneven terrain is encountered, the forward arms 39 and 41 and the rearward arms 44 and 54 pivot upwardly and downwardly as their respective wheels lightly engage the ground under partial support by the springs 92. When the middle raking wheel traverses uneven terrain, the gauge wheel 28 raises and lowers it and the A-frame so that the resilient fingers readily accommodate any further elevational variations reasonably to be expected.

As the raking wheels 30 (100, 129 or 159) engage the forage in their oblique disposition with respect to the direction of travel, they are rotated by resistance to movement offered by the forage and the ground. The forwardmost raking wheel accumulates forage and delivers it to the second raking wheel which accumulates additional forage and delivers it to the rearward raking wheel for ultimate deposit in a windrow with forage raked by the rearward raking wheel. In this respect the operation of the forage harvester of the present invention is like that of the structures shown in the Morrill and Giles patents to which reference has previously been made.

It will be understood that during rotation of the raking wheels, the pins 66, 104 and 133 described circular orbits about their respective hubs 50, as illustrated at 179 in FIG. 5. Further, it will be noted that the forward peripheral segments 85, 112, and 143 and the rearward peripheral segments 86, 113 and 144 travel longitudinally in said orbits. However, during such orbital travel, the segments pivot inwardly and outwardly of their respective wheels and attain a substantially increased linear dimension of ground engagement and a comparable increase in swath. Thus, raking wheels embodying the present invention achieve approximately twice the raking swath of conventional raking wheels of the same diameter. For example, a three-wheel harvester, as shown in FIGS. 1, 2 and 4, utilizing the raking wheels of the present invention achieves a raking swath which is wider than that attained by five wheels of the same diameter but of conventional construction as employed in commercial forms of rotary wheel forage harvesters.

This phenomena can best be understood by reference to FIG. 2. Bearing in mind that the raking wheels 30, as viewed in FIG. 2, rotate in a counterclockwise direction during operation, the sequence of positioning of the segments can be conveniently understood by following the peripheral segments 85 and 86 as they move in a counterclockwise direction from their uppermost position in their orbital travel. When at the top of the wheel, the segments gravitate inwardly against their stops 64 and are substantially concentric to the wheel. As the forward peripheral segment 85 travels downwardly about the wheel, it tends to hang downwardly in a pendant position when it descends below the elevation of its respective hub 50. Unless such attitude is either corrected, or accommodated by utilizing fingers 90a through h of specialized form, the forward peripheral segments tend to strike the ground in a too nearly vertical position and to vault. However, as the companion rearward peripheral segment 86 approaches or reaches the elevation of its respective hub 50, it pivots gravitationally outwardly from the wheel. Such outward pivotal movement causes the tucking finger 77 to engage the tucking shoulder 78 and to move the forward peripheral segment inwardly against its stop for convenient rolling of its wheel thereover. The stop and shoulder are so related that as the forward peripheral segment reaches a position beneath the wheel, its companion rearward peripheral segment 86 approaches the ground in a position substantially tangential thereto.

As the rolling action of the wheel 30 continues, it rolls over the rearward peripheral segment 86 which is returned to concentric relation to its respective wheel against its stop 64. As the forward peripheral segment 85 is carried upwardly about the wheel, it gravitationally pivots outwardly from the wheel until its shoulder 78 engages the finger 77. In such position, the forward peripheral segment is substantially tangentially related to the ground.

As wheel rotation continues, the forward peripheral segment 85 is raised from the ground by the continued orbital travel of its respective pin 66 and the weight of said segment holds its companion rearward peripheral segment 86 inwardly against the wheel by the engagement of the tucking finger 77 with the shoulder 78.

These relative positions of the peripheral segments are maintained until the forward peripheral segment 85 approaches the top of the wheel at which point its center of gravity passes over its pin 66 and the forward peripheral segment pivots inwardly against its stop concentrically of the wheel. As this action progresses with the segments of each of the spokes 60, it will be appreciated that the wheel maintains a maximum number of fingers 90a through h in forage engagement and achieves a substantially increased linear dimension of ground engagement in a manner that may be visualized somewhat as a continuous flattening of the lower periphery of the wheel. This action is schematically represented in FIG. 5 in which the line 180 illustrates the orbit of travel of the outermost finger of each of the rearward peripheral segments 86 and the line 181 illustrates the orbital travel of the outermost fingers of the forward peripheral segments 85 about their hub 50.

With the pins 66 disposed in parallel relation to their respective hubs 50, the fingers 90a through h of the forward peripheral segments 85 of each wheel are disposed substantially in a common plane and the fingers of the rearward peripheral segments 86 of the same wheel are disposed in a common substantially parallel plane. As best shown in FIG. 3, when the fingers of a rearward segment of a first spoke engage the ground at R–1, the fingers of a forward peripheral segment of a second spoke engage the ground at F–2. Substantially concurrently, the fingers of the rearward peripheral segment of the second spoke engage the ground at R–2 and the fingers of a forward peripheral segment of a third spoke engage the ground at F–3. Thus, the fingers of the various segments cooperate in ground engagement and provide an effective raking barrier with the forward fingers disposed in the interstices between the rearward fingers when viewed in the direction of travel of the fingers over the ground. The three wheels are so arranged that their linear dimension of ground engagement overlap when projected axially of the wheels.

The operation of the raking wheel 100 of the present invention is substantially the same as that for the raking wheel 30 with certain distinctions that can be readily understood by reference to FIGS. 10 through 13. As the forward peripheral segments 112 successively approach the ground during wheel rotation, their respective rearward peripheral segments 113 pivot outwardly so that the tucking fingers strike the shoulders and tuck their forward segments 112 inwardly against the stops 120 for convenient rolling of the wheel thereover. Since the arms 115a through h are substantially radially related to their respective pins 104, the springs 123 are utilized to cause somewhat earlier outward pivoting than would otherwise occur. In such tucked position, the four closely adjacent fingers 117a through h engage the ground and form a relatively tight barrier for effective raking.

The rearward peripheral segment 113 having pivoted outwardly is lowered into earth engagement by continued wheel rotation. The wheel then rolls over such rearward segment. It will be noted that each forward segment 112 engages the ground forwardly with respect to the direction of wheel rotation of the rearward segment of the forwardly adjacent spoke.

As the pins 104 successively ascend, the forward peripheral segments 112 pivot outwardly from the wheel as permitted by the fingers 121 and shoulder and are substantially tangential to the ground. At this point the rearward segment of the forwardly adjacent spoke is against the stop 120 in concentric position in rolling ground engagement. Further rotation carries the forward segment upwardly in outwardly pivoted position while it gravitationally holds its respective companion rearward segment inwardly against its stop 120.

As best shown in FIG. 11, during wheel rotation, the fingers of the rearward peripheral segment 113 of a first spoke engage the ground at R–1 rearwardly of the fingers of the forward peripheral segment of a following spoke at F–2. The fingers of the forward peripheral segment of the third spoke engage the ground at F–3 in following relation to the fingers at R–1 of the rearward segment of the first spoke and in leading relation to the fingers of the rearward segment of the second spoke at R–2. This overlapping of the segments achieves a desirable cooperative raking effect with a maximum range of elevational accommodating movement radially in the plane of the wheel.

The third form of raking wheel 129 operates in a similar manner with the tucking finger 155 engaging a leg of the U-shaped strap member 142 to insure that each forward peripheral segment 143 is in proper position when it reaches the ground for the wheel to roll thereover. As previously alluded to, the eccentric relation of the arms 145 to their pins 133 and their additional weight, as compared to the other forms, causes a vigorous pivotal action which is dampened by the spring 151. When the forward segment 143 is in pendant position and its companion rearward segment 144 gravitationally pivots outwardly, the finger 155 strikes the strap member 142 as the forward segment gently resists inward pivotal movement because of the spring 151. Thus, a cushioning of the pivotal movement occurs. Other means for dampening excessively vigorous pivoting action will occur to those skilled in the art.

When six spokes 60 are utilized to mount the peripheral segments 143 and 144 in a raking wheel 129, the order of ground engagement of the fingers 146 is as illustrated in FIG. 15. The fingers of the rearward segment of a first spoke engage the ground at R–1 rearwardly, with respect to the direction of harvester travel, adjacent to the ground engagement at F–2 of the fingers of the forward segment of the next successive spoke. The fingers of the rearward segment of said successive spoke engage the ground rearwardly adjacent to the points of engagement of the fingers of the forward segment of a third spoke at F–3. Although FIGS. 3, 11 and 15 illustrate the points of finger engagement as occurring in two substantially parallel lines, it is found that the forward fingers drag rearwardly to substantial alignment with the rearward fingers.

Although the arms 145 are rigid, the spring fingers 146 possess desired resilience and will be recognized as being of a form which has been commercially popular for many years.

The fourth form of raking wheel 159 is of the same structure and operates in the same manner as the first form 30 except that by utilizing only three spokes, the structure is made lighter and more economical, but the advantages which normally accrue from the overlapping of the segments 85 and 86 of the first form are not obtained. Further, as each forward segment 85 and its companion rearward segment 86 moves over the ground, during earth traversing movement of the harvester and rotation of the wheel 159, they rake a common swath which is usually substantially parallel to the hub of the wheel and has approximately square opposite ends as said segments reach and leave the ground. The following pair of segments have a similar and parallel path but they reach the ground after an interval of time and an increment of travel following the engagement of the preceding pair of segments with the ground. Similarly, the preceding pair leaves the ground an interval of time and an increment of travel ahead of the following pair. As a result, an aggregate swath is raked into a windrow but the swath tends to have notched opposite edges and the windrow is sometimes disturbed by the successively spaced actions of the pairs of segments. In forage in which such notching of the sides of the swath is not objectionable or in which the forage is so intertangled that the notching is avoided, the fourth form of wheel is highly successful and is desirable because of its simplicity and economy. On the other hand, in types of forage that do not intertangle sufficiently to avoid the notching and in which notching is undesirable, the first three forms of raking wheels are preferred because of their swaths of relatively straight side edges.

While it will be observed that each segment illustrated extends through an arc approximately ⅙ of the circumference of its respective wheel and thus three and six spoke wheels have been shown, other segment lengths and other numbers of spokes can be utilized without departing from the spirit or scope of the invention.

In view of the foregoing, it will be apparent that a side delivery forage harvester of the wheel type has been provided which has significantly increased capacity per wheel employed. Further, the harvester has improved capabilities for conforming to uneven ground surfaces during operation than previously achieved. Not only can the peripheral segments pivot outwardly to reach into depressions but they can pivot inwardly to positions concentric to their respective wheels. Additionally, the fingers have increased flexing ability inwardly and outwardly of the wheels due to the expansion and contraction capabilities of the loops 89a through h and 116a through h. The combined accommodation to uneven terrain resulting from such increased flexing of the fingers in the planes of the wheels and the inward and outward pivotal movement of the segments is a multiple of the maximum range previously attainable by rotary side delivery wheel harvesters. Still further, the tortional resilience of the arms 88a through h and 115a through h permits their respective fingers to flex from the plane of their respective wheels forwardly and rearwardly of the direction of harvester travel to achieve improved raking effects.

The described mountings for the peripheral segments of the raking wheels are simple, effective and economical to produce.

It is well known that the fingers in rotary side delivery wheel harvesters are subject to wear and ultimately require repair or replacement. This can be effected in the device of the present invention with an absolute minimum of effort and time. Any pair of peripheral segments and their respective fingers can be removed from their raking wheel by removing a single cotter key and withdrawing a single pin on which their mounting blocks are mounted. Such pair of segments can be replaced for operation by the insertion of the single pin and cotter key.

The raking wheels of the present invention achieve more effective raking and tedding as a result of their improved conformance to ground traversed and minimize shattering of the forage. For example, it is known that the greatest proportion of shattering occurs when forage accelerates and decelerates, or changes direction, in being passed from one raking wheel to another. Since the harvester of the present invention makes possible the raking of a given swath with fewer wheels, correspondingly less shattering of the forage occurs. As a companion advantage, the utilization of fewer raking wheels to accomplish a given purpose, makes possible greater design variations in the harvesters to meet specialized requirements.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A forage harvester comprising a mobile frame having a predetermined relative direction of movement, a plurality of raking wheels, and means mounting the wheels on the frame for rotation in substantially erect planes oblique to said direction of movement, said wheels having peripheral segments articulately mounted on their respective wheels for movement between positions substantially concentric to their respective wheels and positions outwardly pivoted therefrom.

2. A forage harvester comprising a frame adapted for ground traversing movement, and a plurality of wheels mounted by the frame in ground engagement for rotation in substantially erect parallel planes during said movement, said wheels having peripheral segments mounted for pivotal movement between positions substantially concentric to their respective wheels for successive ground engagement in rolling movement over the ground and positions outwardly pivoted therefrom for increased linear dimension of ground engagement, said segments having means for individually successively pivoting them outwardly when adjacent to the ground.

3. A forage harvester comprising a mobile frame having a predetermined relative direction of movement, a plurality of raking wheels, and means mounting the wheels on the frame for rotation in substantially erect planes oblique to said direction of movement, said wheels having peripheral segments pivotally mounted on their respective wheels for movement between positions substantially concentric to their respective wheels for successive ground engagement in rolling movement over the ground and positions outwardly pivoted therefrom, said segments having centers of gravity so located in relation to their pivotal mountings individually successively to pivot said segments outwardly when adjacent to the ground and inwardly during continued rolling movement of their respective wheels.

4. A forage harvester comprising a mobile frame having a predetermined relative direction of movement as a reference; a plurality of raking wheels; and means mounting the raking wheels in the frame for rotation in substantially erect parallel planes oblique to said direction of movement, said wheels having peripheral segments of substantially equal length providing opposite ends, means individual to the segments pivotally mounting ends of their respective segments on their wheels with opposite ends of the segments extended therefrom circumferentially of their respective wheels for inward and outward movement, stops individual to the segments limiting inward pivotal movement of the segments to positions substantially concentric to their wheels for rolling ground engagement, and means integral with the segments urging the segments outwardly of their wheels when adjacent to the ground for increased linear dimension of ground engagement.

5. The forage harvester of claim 4 in which the segments of the different wheels overlap in linear dimension of ground engagement when said dimensions are projected axially of the wheels.

6. A forage harvester comprising a mobile frame having a predetermined relative direction of movement as a reference; a plurality of raking wheels; and means mounting the raking wheels in the frame for rotation in substantially erect parallel planes oblique to said direction of movement, said wheels being divided into pairs of peripheral segments of substantially equal length having adjacent ends, means mounting the adjacent ends of the segments of each pair with the segments of each wheel in circumscribing relation for pivotal movement of the segments inwardly and outwardly of their respective wheels, stops individual to the segments limiting inward pivotal movement of their respective segments to positions substantially concentric to their wheels for rolling ground engagement, said segments when adjacent to the ground being gravitationally urged outwardly of their respective wheels for increased linear dimension of ground engagement.

7. A forage harvester comprising a mobile frame having a predetermined relative direction of movement as a reference; a plurality of raking wheels; and means mounting the raking wheels in the frame for rotation in substantially erect parallel planes oblique to said direction of movement, said wheels being divided into pairs of peripheral segments of substantially equal length having adjacent ends, means mounting the adjacent ends of the segments of each pair for pivotal movement of the segments inwardly and outwardly of their respective wheels, said segments of each pair being extended oppositely circumferentially of their wheels, stops mounted on the wheels individual to the segments limiting inward pivotal movement of their respective segments to positions substantially concentric to their wheels for rolling ground engagement, and means urging the segments outwardly of their respective wheels when adjacent to the ground for increased linear dimension of ground engagement.

8. A forage harvester comprising a mobile frame having a predetermined relative direction of movement as a reference; a plurality of raking wheels; and means mounting the raking wheels in the frame for rotation in substantially erect parallel planes oblique to said direction of movement, said wheels being divided into pairs of arcuate peripheral segments of substantially equal length having adjacent ends, means mounting the adjacent ends of the segments of each pair for pivotal movement of the segments inwardly and outwardly of their respective wheels, said segments of each pair being extended oppositely circumferentially of their wheels whereby each pair has a leading segment and a trailing segment with respect to the direction of wheel rotation, stops mounted on the wheels individual to the segments limiting inward pivotal movement of their respective segments to positions substantially concentric to their wheels for rolling ground engagement, the leading segments being so balanced in relation to their mountings that they tend to assume pendant positions as they approach the ground and to pivot outwardly as they are carried from the ground incident to wheel rotation and the trailing segments being so balanced in relation to their mountings that they pivot outwardly as they approach the ground and are moved to said concentric positions as their respective wheels roll over them, and relative motion limiting means interconnecting the segments of each pair thrusting the leading segments to their concentric positions against their stops to tuck them under their wheels when their respective trailing segments pivot outwardly, the engagement of the leading segments with their stops limiting outward pivotal movement of their respective trailing segments to positions substantially tangential to the ground as they reach the ground, said motion limiting means limiting outward pivotal movement of the leading segments to positions substantially tangential to the ground as they are carried from the ground by engagement of their respective trailing segments with their stops.

9. The harvester of claim 8 in which the segments each comprise an elongated finger having a predetermined forage engaging end outwardly extended from the segment's respective wheel, and an elongated arm integral with the finger substantially concentric to the segment's respective wheel and extended in a direction circumferential thereof, said finger and arm being of tortionally resilient bar material and said finger being flexible rearwardly with respect to the direction of frame movement incident to tortional flexing of the arm.

10. The harvester of claim 8 in which the segments each comprise an elongated finger having an end outwardly extended from its respective wheel and an inner end, a loop continuous with the inner end of the finger, and an arcuate arm continuous with the loop extended circumferentially of the wheel and connected to its respective mounting means, the arm, loop and a linear portion of the finger lying in a substantially common plane, the finger being resiliently flexible in said plane incident to flexing of the loop and being resiliently flexible from said plane incident to tortional flexing of the arm.

11. The harvester of claim 10 in which said plane is substantially coincident with the plane of the wheel.

12. A forage harvester comprising a mobile frame having a predetermined relative direction of movement as a reference; a plurality of raking wheels; and means mounting the raking wheels in the frame for rotation in substantially erect parallel planes oblique to said direction of movement, said wheels being circumscribed by endwardly adjacent sets of raking fingers, each set having its fingers disposed substantially in a common plane and interconnected in an elongated unitary assembly constituting a peripheral segment of the wheel having opposite ends, means borne by the wheels pivotally mounting an end of each assembly for pivotal movement of the opposite end thereof inwardly and outwardly of its respective wheel and for longitudinal orbital travel incident to rotation of its wheel, and stops disposed in spaced relation to the pivotal mounting means engageable with the sets limiting their inward pivotal movement to positions substantially coincident with their orbital travel longitudinally circularly aligned concentrically of their respective wheels for successive rolling engagement of the sets with the ground while adjacent sets in proximity to ground engagement gravitationally pivot outwardly for increased extent of forage contact.

13. In a forage harvester, a wheel having outwardly extended fingers and being rotatable in ground engagement, said wheel being divided into substantially equal peripheral segments individually pivotally mounted for movement relatively inwardly and outwardly of the wheel and having stops operable to limit inward pivotal movement of the segments to substantially concentric relation to the wheel to support weight of the wheel during rotation in ground engagement while successively adjacent segments pivot outwardly to ground engagement to increase the peripheral extent of such engagement.

14. A forage harvesting wheel comprising a plurality of sets of raking fingers each having its fingers disposed substantially in a common plane and being interconnected in an elongated unitary assembly having opposite ends, means connected to an end of each set mounting the sets for longitudinal orbital travel in a common direction in a substantially common plane concentrically about a predetermined substantially horizontal axis, each of the sets having an extended end which gravitationally pivots inwardly and outwardly of the axis incident to said orbital travel, said means mounting the sets for successive engagement with the ground and/or forage disposed thereon during said orbital travel, and stops engageable with the sets to limit inward pivotal movement of the extended ends thereof to positions substantially coincident with said orbital travel whereby the sets can roll over the ground with the sets successively engaged with the ground in inwardly pivoted positions and successively adjacent sets pivoted outwardly to ground engagement to increase the peripheral extent of ground engagement by the wheel.

15. A forage harvesting wheel comprising a plurality of pairs of rim segments constituting substantially equal fractional parts of an annulus and having adjacent ends; means pivotally mounting the adjacent ends of each pair of segments for pivotal movement of the segments inwardly toward said annulus and outwardly therefrom and for revolution about an axis substantially concentric to said annulus whereby said segments successively gravitationally pivot inwardly toward said annulus and outwardly therefrom incident to such rotation, and stop means engageable with said segments to limit their inward pivotal movement to positions substantially coincident with said annulus.

16. A forage harvesting wheel comprising a hub, spokes radially extended from the hub in substantially equally spaced relation thereabout, rim segments having outwardly extended fingers pivotally mounted on the extended ends of the spokes and oppositely extended from their respective spokes circumferentially of the hub, said segments collectively forming an annulus concentrically about the hub, stop means mounted on the spokes engageable with the rim segments limiting their pivotal movement inwardly toward the hub to positions substantially coincident with said annulus, means mounting the hub for earth traversing movement with said annulus in adjacent proximity to the ground and for rotation with the fingers in successive engagement with forage disposed on the ground and whereby the wheel has a predetermined direction of rotation in relation to which each spoke has a relatively leading segment and a trailing segment and the segments tend successively to pivot inwardly to the annulus and outwardly therefrom incident to gravitational influences during such rotation, and means engageable between the segments of each spoke operable to pivot the leading segment thereof inwardly to the annulus in response to outward pivotal movement of its respective trailing segment.

17. A forage harvesting wheel adapted for rotation in peripheral earth engagement comprising a plurality of pairs of arcuate peripheral segments of substantially equal length, said segments circumscribing the wheel in end to end relation, means mounting the adjacent ends of the segments of each pair for independent pivotal movement of the segments inwardly and outwardly of the wheel, said segments of each pair being extended oppositely circumferentially of the wheel whereby each pair has a predetermined leading segment and a trailing segment with respect to the direction of wheel rotation, stops borne by the mounting means individual to the segments limiting inward pivotal movement of their respective segments to positions substantially concentric to the wheel for rolling ground engagement, the leading segments being so balanced in relation to their mountings that they tend to assume pendant positions as they approach the ground and to pivot outwardly as they are carried from the ground incident to wheel rotation and the trailing segments being so balanced in relation to their mountings that they pivot outwardly as they approach the ground and are moved to said concentric positions as the wheel rolls over them, and relative motion limiting means interconnecting the segments of each pair thrusting the leading segments to their concentric positions against their stops to tuck them under the wheel when their respective trailing segments pivot outwardly, the engagement of the leading segments with their stops limiting outward pivotal movement of their respective trailing segments to positions substantially tangential to the ground as they reach the ground, said motion limiting means limiting outward pivotal movement of the leading segments to positions substantially tangential to the ground as they are carried from the ground by engagement of their respective trailing segments with their stops.

18. In a forage harvester having a raking wheel mounted for earth traversing movement and rotation in a plane disposed at an angle to the direction of said movement, the combination of a raking element of elongated spring material having an elongated arcuate arm portion of a radius substantially equal to the radius of the wheel, said arm portion having an end providing a finger outwardly extended from the wheel and an opposite end; and means connected to said opposite end of the arm portion mounting said arm portion on the wheel substantially in a plane thereof whereby during rotation of the wheel the finger is periodically brought into raking ground engagement and tortional resilience of said arm portion permits flexing of the finger rearwardly with respect to the direction of earth traversing movement of the harvester.

References Cited by the Examiner
UNITED STATES PATENTS

| | | | |
|---|---|---|---|
| 687,314 | 11/1901 | Jarmain | 56—370 |
| 2,447,354 | 8/1948 | Morrill | 56—377 |
| 2,670,588 | 3/1954 | Plant | 56—377 |
| 2,811,009 | 10/1957 | Plant | 56—377 |
| 2,860,478 | 11/1958 | Van der Lely et al. | 56—377 |
| 2,945,339 | 7/1960 | Van der Lely et al. | 56—377 |
| 2,987,867 | 6/1961 | Nicholson | 56—400 |
| 3,026,667 | 3/1962 | Morrison et al. | 56—400 |

ABRAHAM G. STONE, *Primary Examiner.*

R. R. KINSEY, *Examiner.*